(12) United States Patent
Guo et al.

(10) Patent No.: US 6,472,962 B1
(45) Date of Patent: Oct. 29, 2002

(54) INDUCTOR-CAPACITOR RESONANT RF SWITCH

(75) Inventors: Lihui Guo; Joseph Xie, both of Singapore (SG)

(73) Assignee: Institute of Microelectronics, Singapore (SG)

( * ) Notice: Subject to any disclaimer, the term of this patent is extended or adjusted under 35 U.S.C. 154(b) by 0 days.

(21) Appl. No.: 09/858,583

(22) Filed: May 17, 2001

(51) Int. Cl.[7] ................................................. H01P 1/10
(52) U.S. Cl. ......................... 333/262; 200/181; 29/622
(58) Field of Search .................. 333/262, 105; 200/181; 29/622, 592.1; 455/78; 438/757

(56) References Cited

U.S. PATENT DOCUMENTS

| | | | |
|---|---|---|---|
| 5,578,976 A | 11/1996 | Yao | 333/262 |
| 5,619,061 A | 4/1997 | Goldsmith et al. | 257/528 |
| 5,872,489 A * | 2/1999 | Chang et al. | 331/179 |
| 5,880,921 A | 3/1999 | Tham et al. | 361/233 |
| 6,020,564 A | 2/2000 | Wang et al. | 200/181 |
| 6,049,702 A * | 4/2000 | Tham et al. | 455/78 |
| 6,069,540 A | 5/2000 | Berenz et al. | 333/101 |
| 6,074,890 A | 6/2000 | Yao et al. | 438/52 |
| 6,204,737 B1 * | 3/2001 | Ella | 333/187 |
| 6,232,841 B1 * | 5/2001 | Bartlett et al. | 330/305 |
| 6,232,847 B1 * | 5/2001 | Marcy, V et al. | 331/167 |
| 6,376,787 B1 * | 4/2002 | Martin et al. | 200/181 |

OTHER PUBLICATIONS

Z.J. Yao et al., "Micromachined Low–Loss Microwave Switches," IEEE Journal of Microelectromechanical Systems, vol. 8, No. 2, Jun. 1999, pp. 129–134.

J.B. Muldavin et al., "High–Isolation Inductively–Tuned X–Band MEMS Shunt Switches," 2000 IEEE MTT–S International Symposium Digest, Jun. 2000, pp. 169–172.

* cited by examiner

Primary Examiner—Benny Lee
Assistant Examiner—Dean Takaoka
(74) Attorney, Agent, or Firm—George O. Saile; Stephen B. Ackerman; Douglas R. Schnabel

(57) ABSTRACT

A new inductor-capacitor resonance RF (LCR-RF) switching device is achieved. The device comprises a microelectronic mechanical switch and a spiral inductor. The microelectronic mechanical switch comprises, first, a first dielectric layer overlying a substrate. A down electrode overlies the first dielectric layer. A second dielectric layer overlies the down electrode. An up electrode overlies the down electrode with the second dielectric layer therebetween. A bridge post overlies the first dielectric layer and does not contact the down electrode or the up electrode. Multiple bridge posts may be used. Finally, a membrane is suspended over said down electrode. One end of the membrane is fixed to the top of the bridge post. An electrostatic potential between the membrane and the down electrode will cause the membrane to flex down toward the down electrode. This flexing of the membrane will cause the capacitance of the switching device to vary. The spiral inductor comprises a metal line configured in a spiraling pattern with a first end connected to the bridge post and a second end forming an output node. A dual damascene method to form the LCR-RF switch is also achieved.

30 Claims, 14 Drawing Sheets

INDUCTOR-CAPACITOR RESONANT RF SWITCH

BACKGROUND OF THE INVENTION (1) Field of the Invention

The invention relates to a microelectronic mechanical switch (MEMS) device and method of fabrication, and more particularly, to an inductor-capacitor resonant radio 54 frequency (LCR RF) switch and a method of fabricating a LCR RF switch.

(2) Description of the Prior Art

Generally, RF switches, consisting of solid state devices, such as diodes and field-effect transistors (FET), are used in communication systems applications. For very high frequencies of about 1 GHz, these diode and FET devices are typically fabricated using expensive GaAs technology. However, RF switches fabricated using diodes and FET devices demonstrate high insertion loss and low isolation when the working frequency exceeds 1 GHz. In addition, the value of the isolation decreases with frequency.

Recently, microelectronic mechanical (MEMS) technology has been used for the fabrication of RF switches. A MEMS switch features significant advantages in its small size as measured in the operating wavelength. MEMS has potentially lower costs since IC batch processing can be used. As an example, a microelectronic mechanical switch (MEMS) may be constructed which uses electrostatic force to flex a thin membrane and thereby cause the switch to be opened or closed. Such devices are fabricated with dimensions in the range of 100's of microns and can be integrated onto an integrated circuit device. Since an electrostatic force is used, the switch can be controlled using only a voltage and very little, or no, current. Therefore, it consumes virtually no power. This is an important advantage for portable communication systems, such as hand-held mobile phones or other wireless communication devices, where power consumption is recognized as a significant operating limitation.

Referring now to FIG. 1, an MEMS device is illustrated in cross section. There is shown, in highly simplified form, a MEMS switch over which the present invention is an improvement. It is to be understood in this regard that no portion of FIG. 1 is admitted to be prior art as to the present invention. Rather, this highly simplified diagram is provided in an effort to provide an improved understanding of the problems which are overcome by the invention.

In this example, the device is fabricated on a substrate 10. An insulating layer 12 overlies the substrate 10 to isolate the switch from the substrate 10. A metal microstrip 14 overlies the dielectric layer 12. The metal microstrip 14 may be designed to carry a microwave signal, for example. A dielectric layer 18 overlies the metal microstrip 14. A bridge structure is formed by the combination of the bridge posts 22 and the membrane 26. The bridge posts 22 are formed straddling the metal microstrip 14. The membrane 26 is fixed to the bridge posts 22 at each end. The bridge posts 22 and membrane 26 may comprise metallic materials. The membrane 26 is very thin such that an electrostatic force can cause it to flex. The distance between the membrane 26 and the dielectric layer 18 is an air gap.

This MEMS device has two states of operation. In the UP state, the membrane 26 is suspended above the dielectric layer 18 as shown. In this state, there is very little capacitive coupling between the bridge structure and the metal microstrip 14. At microwave frequencies, the small capacitor between the bridge structure 22 and 26 and the metal microstrip 14 forms a large impedance value. Therefore, very little of the microwave energy is transferred into the bridge structure 22 and 26.

Referring now to FIG. 2, the DOWN state of operation of the MEMS device is shown. If a sufficiently large, DC bias voltage exists between the membrane 26 and the metal microstrip 14, the electrostatic force will cause the thin membrane 26 to flex toward the microstrip 14. At maximum deflection, the membrane 26 contacts the dielectric layer 18 as shown. In this state, the capacitive coupling between the microstrip 14 and the bridge structure 22 and 26 is much higher than in the non-flexed state. The large capacitance forms a much smaller impedance value for the microwave signal. Therefore, much of the microwave energy is conducted into the bridge structure 22 and 26.

As can be seen, the MEMS device functions as a variable capacitor on the microstrip 14 node of the circuit. When the membrane is in the UP state, the switch is OFF. The signal flowing on the microstrip 14 continues to flow along the microstrip 14. When the membrane is down, due to the DC bias, the switch is ON. The signal is redirected through the capacitor and into the bridge membrane 26 and posts 22.

The figure of merit for the MEMS device is the ratio of the insertion loss in the DOWN state and the isolation during the UP state. The MEMS exhibits very low insertion loss and very high isolation. The resonant frequency of the MEMS device determines the particular frequency at which the high isolation can be achieved. The resonant frequency depends upon the capacitance in the DOWN state and the small inductance of the bridge structure. Note that the area of the capacitor formed between the membrane 26 and the microstrip 14 in the DOWN state is proportional to the area of the bridge contacting the dielectric layer 18, which is, in turn, proportional-to the contact length L1.

Referring now to FIG. 3, an equivalent circuit model for the MEMS device is shown. In this model, the MEMS device is configured as a shunt switch. The bridge posts are connected to ground. The microstrip is modeled as the lumped impedance elements $Z_0$ 48. The MEMS bridge is modeled as a variable capacitor $C_b$ 52, a series inductance $L_b$ 56 and a series resistance $R_s$ 60. The variable capacitor $C_b$ 52 represents the aforementioned variable capacitive coupling due the deflection of the membrane. The series inductance $L_b$ 56 and series resistance $R_s$ 60 are due to the physical characteristics of the membrane and bridge posts. When the MEMS switch is in the UP state, $C_b$ 52 is small, and most of the microwave energy is conducted past the switch. When the MEMS switch is in the DOWN state, $C_b$ 52 is large, and most of the microwave energy is conducted through the switch to ground.

Note that, in the DOWN state, the series capacitance $C_b$ 52 and the series inductance $L_b$ 56 result in a series resonant frequency given by:

$$\omega = 1/(L_b C_b)^{1/2}.$$

Typically, the MEMS device can be optimized for useful operating frequencies of greater than about 5 GHz. However, for frequency bands below 5 GHz, this MEMS device exhibits too low of an isolation. This is because the bridge inductance $L_b$ is usually very small and is not adjustable.

Finally, the fabrication technique for this MEMS capacitor RF switch is difficult to control. One fabrication technique is to spin on a photoresist layer prior to the deposition of the thin membrane layer. The photoresist layer is then removed to form the deflection gap. Unfortunately, it is very difficult to uniformly control the thickness of spun on photoresist. The yield of qualified MEMS devices in a wafer will therefore be limited.

Several prior art approaches disclose MEMS devices and methods to form MEMS devices. Z. J. Yao et al, "Micromachined Low-Loss Microwave Switches," IEEE Journal of Microelectromechanical Systems, Vol. 8, No. 2, June 1999, pp. 129–134, discloses an MEMS device for microwave applications. A capacitively-coupled switch is formed where a dielectric layer separates a bottom electrode from a suspended membrane. J. B. Muldavin et al, "High-Isolation Inductively-Tuned X-Band MEMS Shunt Switches," 2000 IEEE MTT-S International Symposium Digest, June 2000, pp. 169–172, discloses an inductively-tuned MEMS device. Straight transmission lines are used to add inductance to the shunt-configured, MEMS switch circuit between the bridge and ground. U.S. Pat. No. 5,619,061 to Goldsmith et al teaches various configurations of micromechanical microwave switches. Dielectric, metallic, and combination membranes are disclosed. Both direct coupling and capacitive coupling are taught. U.S. Pat. No. 6,069,540 to Berenz et al discloses a MEMS device with a pivot pin structure. A rigid beam is used to improve reliability. U.S. Pat. No. 5,880,921 to Tham et al teaches a switched capacitor bank formed using MEMS technology. U.S. Pat. No. 6,074,890 to Yao et al discloses a MEMS device where the motion of a signal device is coupled to the motion of a slave device. The preferred fabrication uses a backside dry etch to release the suspended MEMS devices and mechanical couplers. U.S. Pat. No. 6,020,564 to Wang et al teaches a MEMS device where the actuation voltage is reduced by leveraging a small actuating beam movement into a large longitudinal beam movement. U.S. Pat. No. 5,578,976 to Yao teaches a MEMS device with a cantilevered beam-fabricated from dielectric material.

SUMMARY OF THE INVENTION

A principal object of the present invention is to provide an effective and very manufacturable MEMS-based inductor-capacitor resonant RF switch and method of fabrication.

A further object of the present invention is to provide a MEMS-based inductor-capacitor resonant RF switch by combining a MEMS variable capacitor and a spiral inductor.

A yet further object of the present invention is to combine a MEMS variable capacitor and a spiral inductor to thereby create an inductor-capacitor resonant RF switch with improved operating characteristics below 5 GHz.

Another further object of the present invention is to improve the operating characteristics of a MEMS variable capacitor by adding an upper electrode to increase capacitive coupling between the membrane and the microstrip.

Another further object of the present invention is to apply the inductor-capacitor resonant RF switch in a shunting configuration.

Another further object of the present invention is to apply the inductor-capacitor resonant RF switch in a series configuration.

Another further object of the present invention is to apply the inductor-capacitor resonant RF switch in a multiple-channel, series configuration.

Another further object of the present invention is to provide a method of fabricating a microelectronic mechanical switch device with improved uniformity.

Another yet further object of the present invention is to provide a method of fabricating a microelectronic mechanical switch device using a dual damascene process.

In accordance with the objects of this invention, a new inductor-capacitor resonance RF switching device is achieved. The device comprises a microelectronic mechanical switch and a spiral inductor. The microelectronic mechanical switch comprises, first, a first dielectric layer-overlying a substrate. A down electrode overlies the first dielectric layer. A second dielectric layer overlies the down electrode. An up electrode may overlie the down electrode with the second dielectric layer therebetween. A bridge post overlies the first dielectric layer and does not contact the down electrode or the up electrode. Multiple bridge posts may be used. Finally, a membrane is suspended over said down electrode. At least one end of the membrane is fixed to the top of a bridge post. An electrostatic potential between the membrane and the down electrode will cause the membrane to flex down toward the down electrode. This flexing of the membrane will cause the capacitance of the switching device to vary. The spiral inductor comprises a metal line configured in a spiraling pattern with a first end connected to a bridge post and a second end forming an output node.

Also in accordance with the objects of this invention, a new multiple channel, series configured LCR-RF switching circuit is achieved. The circuit comprises a plurality of MEMS capacitor and spiral inductor pairs. In each pair, a first end of each spiral inductor is connected to a bridge post of each MEMS capacitor. The down electrodes of all the MEMS capacitors are connected to a single input signal. A second end of each spiral inductor forms a plurality of output signals. Activation of any MEMS capacitor in any pair causes the input signal to flow to the output signal for the pair.

Also in accordance with the objects of this invention, a new method to fabricate a microelectronic mechanical switch device is achieved. A down electrode is provided overlying a substrate with a first dielectric layer therebetween. A second dielectric layer is provided overlying the down electrode layer. A first silicon dioxide layer is deposited overlying the second dielectric layer. A silicon nitride layer is deposited overlying the first silicon dioxide layer. A second silicon dioxide layer is deposited overlying the silicon nitride layer. The second silicon dioxide layer, the silicon nitride layer, the first silicon dioxide layer, and the second dielectric layer are patterned to form deep trenches for planned bridge posts. The second silicon dioxide layer and the silicon nitride layer are patterned to form shallow trenches for the planned membrane. The shallow trenches connect to the deep trenches. A metal layer is deposited overlying the second silicon dioxide layer, the silicon nitride layer, the first silicon dioxide layer, and the second dielectric layer to fill the deep trenches and the shallow trenches. The metal layer is polished down to the silicon nitride layer to complete the bridge posts and the membrane. The second silicon dioxide layer, the silicon nitride layer and the first silicon dioxide layer are etched away to release the membrane and to complete the microelectronic mechanical switch device in the manufacture of the integrated circuit device.

BRIEF DESCRIPTION OF THE DRAWINGS

In the accompanying drawings forming a material part of this description, there is shown.

DESCRIPTION OF THE PREFERRED EMBODIMENTS

The LCR-RF switch device of the present invention is applied in a shunt configuration, a series configuration, and a multiple channel, series configuration. Two preferred embodiments of the device are disclosed. In the first preferred embodiment, a bridge structure with two bridge posts is described. In the second embodiment, a single post bridge structure is described. A preferred embodiment of the method of forming the LCR-RF switch is described. It should be clear to those experienced in the art that the present invention can be applied and extended without deviating from the scope of the present invention.

The LCR-RF switch of the present invention comprises two components: a novel MEMS capacitor device and a spiral inductor. The novel combination of the MEMS capacitor device and the inductor facilitates the formation of an LCR-RF switch with improved frequency response characteristics. The unique features of the device of the present invention, in its two embodiments, will be described. The unique features of the method of fabricating the device will be described in a section following.

Figure 4:
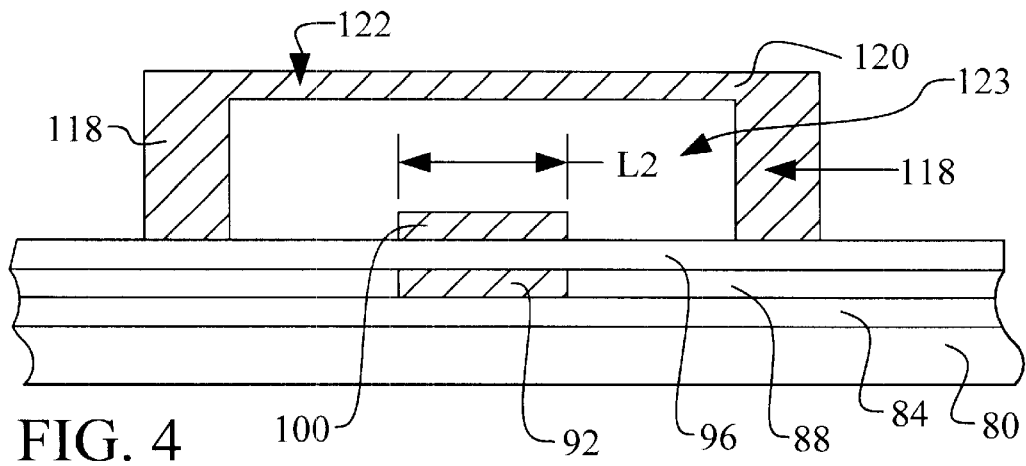
FIGS. 4 and 5 schematically illustrate, in cross sectional representation, a first preferred embodiment of the MEMS capacitor of the present invention.

Referring now more particularly to FIG. 4, there is illustrated a cross-section of a partially completed integrated circuit device of the first preferred embodiment. More particularly, a cross section of the first embodiment of the unique MEMS capacitor device of the LCR-RF switch is illustrated. Several important features of the present invention are shown. The MEMS capacitor is a switching device that uses the membrane flexing principle of operation as outlined in the prior art device. A substrate 80 may comprise a semiconductor wafer and may further comprise monocrystalline silicon. This substrate 80 may also further comprise a thick dielectric material, such as silicon dioxide, or a low-k material. For simplicity of illustration, the substrate 80 is shown as a monolithic layer. In practice, a plurality of active and passive devices, layers, and connective lines may be formed in the substrate 80 prior to the formation of the LCR-RF device.

A first dielectric layer 84 overlies the substrate 80. The first dielectric layer 84 electrically isolates the substrate from the rest of the MEMS structure. A down electrode 92 overlies the first-dielectric lawyer 84. The down electrode 92 acts as the signal input line for the LCR-RF device. The down electrode 92 preferably comprises a metal layer. An interlevel dielectric layer 88 overlies the first dielectric layer 84 and isolates the down electrode 92. This configuration of the interlevel dielectric layer 88 facilitates the formation of the down electrode 92 by a damascene process. The dielectric layers 84 and 88 are chosen to have different etching rates with respect to each other. Dielectric layers 84 and 88 preferably comprise silicon nitride and silicon dioxide, respectively. A second dielectric layer 96 overlies the down electrode 92. The second dielectric layer 96 is the capacitive coupling dielectric for the MEMS capacitor. The second dielectric layer 96 preferably comprises silicon nitride that has a thickness of between about 300 Angstroms and 2,000 Angstroms.

A particularly important feature is the up electrode 100. The up electrode 100 overlies the down electrode 92 with the second dielectric layer 96 therebetween. The up electrode 100 provides a conductive plate to increase the effective capacitance of the MEMS capacitor in the flexed state. Further, the capacitance of the MEMS capacitor in the flexed state can be carefully designed and controlled by the area of the up electrode 100 to thereby cause resonance at a specific frequency. The area of the up electrode is proportional to length L2. Finally, the up electrode 100 preferably comprises a metal layer.

Another important feature of the present invention is the bridge structure 120. In the bridge structure 120 of the present invention, a single metal layer 120 forms the two bridge posts 118 and the membrane 122. The novel bridge structure 120 may be formed using a dual damascene process as will be described in the method of fabrication. In addition, the thin membrane 122 has a preferred thickness of between about 5,000 Angstroms and 25,000 Angstroms.

If the voltage potential between the down electrode 92 and the membrane 122 is less than the minimum activation voltage, then the MEMS capacitor device is in the UP state as shown in FIG. 4. In the UP state, the capacitive coupling between the membrane 122 and the down electrode 92 is at a minimum due to the large air gap 123 between the membrane 122 and the up electrode 100. At microwave frequencies, the small capacitance between the bridge structure 120 and the down electrode forms a large impedance value. Therefore, very little of the microwave energy is transferred into the bridge structure 120 from the down electrode.

Figure 5:
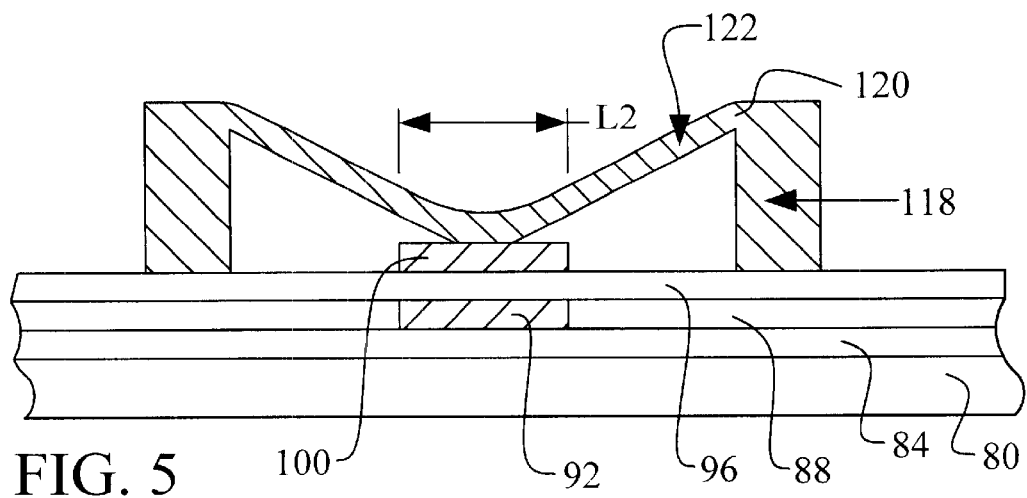

Referring now to FIG. 5, the DOWN state of the MEMS capacitor is shown. To achieve DOWN state, a sufficiently large DC bias is created between the down electrode 92 and the membrane 122. This DC bias may be applied in addition to a high frequency signal flowing on the down electrode 92. The DC voltage causes the thin membrane 122 to flex toward the down electrode 92 due to electrostatic force.

Figure 1:
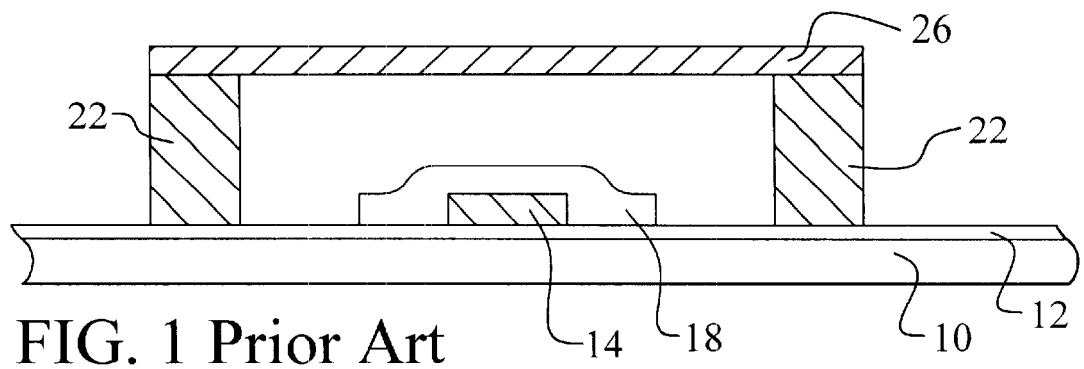
FIGS. 1 through 3 schematically illustrate a prior art MEMS device.
Figure 2:
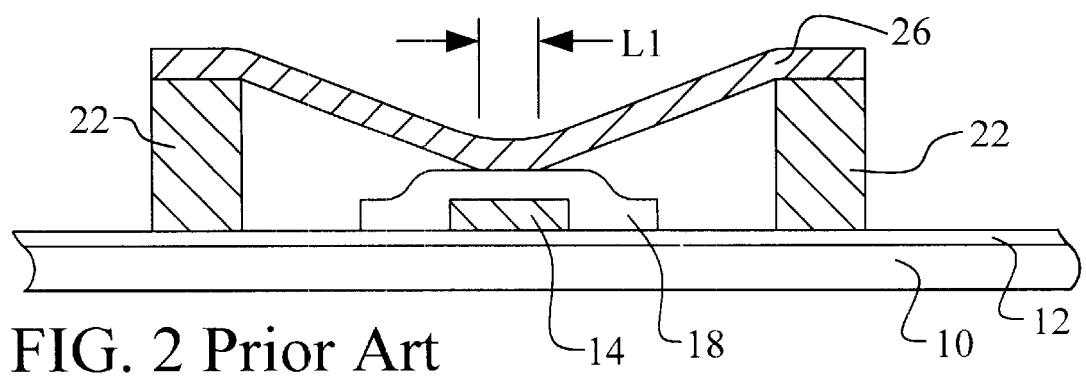
Figure 3:
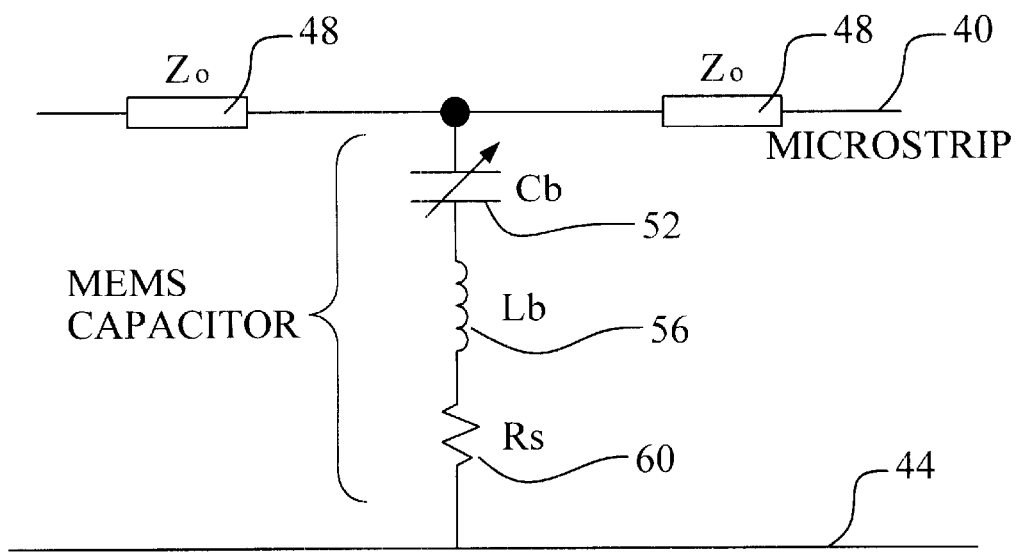

At full flexure, the membrane 122 contacts the up electrode 100. This is a particularly important feature of the present invention. As can be seen, the contacting surface area between the membrane 122 and the up electrode 100 is rather small. This was also true for the MEMS capacitor of FIG. 2. However, the unique up electrode 100 of the present invention creates a large top plate to greatly increase the length L2, and, therefore, the area of capacitive coupling between the membrane 122 and the down electrode 92. The DOWN state capacitance of the MEMS capacitor of the present invention is therefore much greater than that of a comparable device of FIG. 2.

Figure 6:
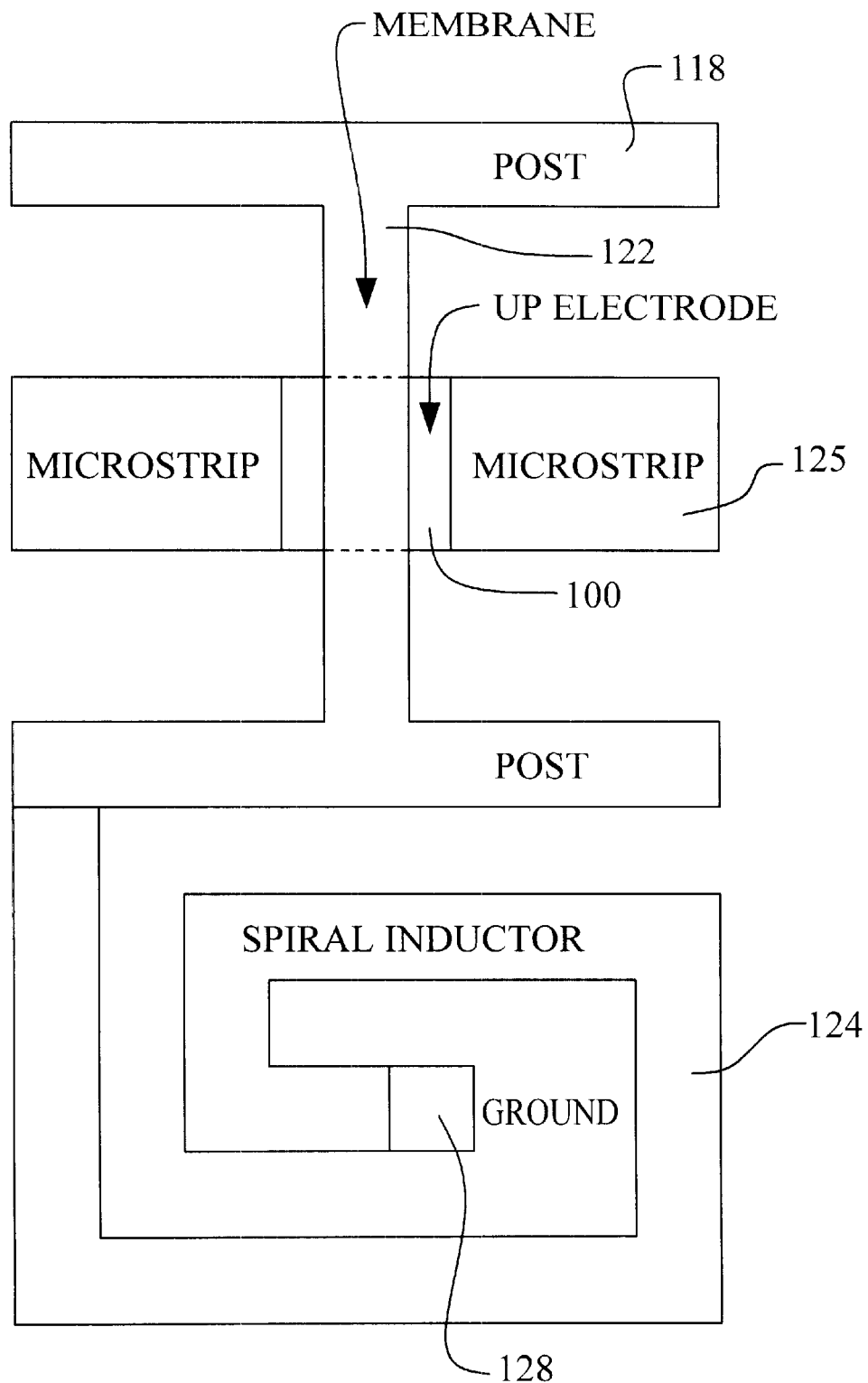
FIG. 6 illustrates in top view a first preferred embodiment of the LCR-RF switch of the present invention.

Referring now to FIG. 6, a top view of the LCR-RF switch device is illustrated. The LCR-RF switch in the present invention is formed by the novel combination of the MEMS capacitor of FIG. 4 with a spiral inductor. In this illustration, the LCR-RF switch is in a shunt configuration. The membrane 122, supported on the posts 118, crosses over the up electrode 100. The down electrode, not shown, underlies the up electrode 100. The microstrip line 125 is connected to the down electrode. The microstrip line 125 carries the high frequency signal.

One of the posts 118 is connected to the spiral inductor 124. The spiral inductor 124 comprises a metal line configured in a spiraling pattern with a first end connected to the bridge post 118 and a second end forming an output node. In this case, the second end of the spiral inductor is connected to ground 128.

When the membrane is the UP state, the signal flowing through the microstrip 125 is unaffected by the switch due to the minor capacitive coupling of the UP state. However, in the DOWN state, the increased capacitive coupling channels the microwave signal into the membrane 122 and the bridge posts 118. The signal flows through the spiral inductor 124 to ground 128. The switch effectively shunts the signal to ground. In the preferred embodiment, the DOWN state capacitance varies between about 10 fF and 30 pF. In the preferred embodiment, the spiral inductor value is between about 1 nH and 30 nH.

Figure 7:
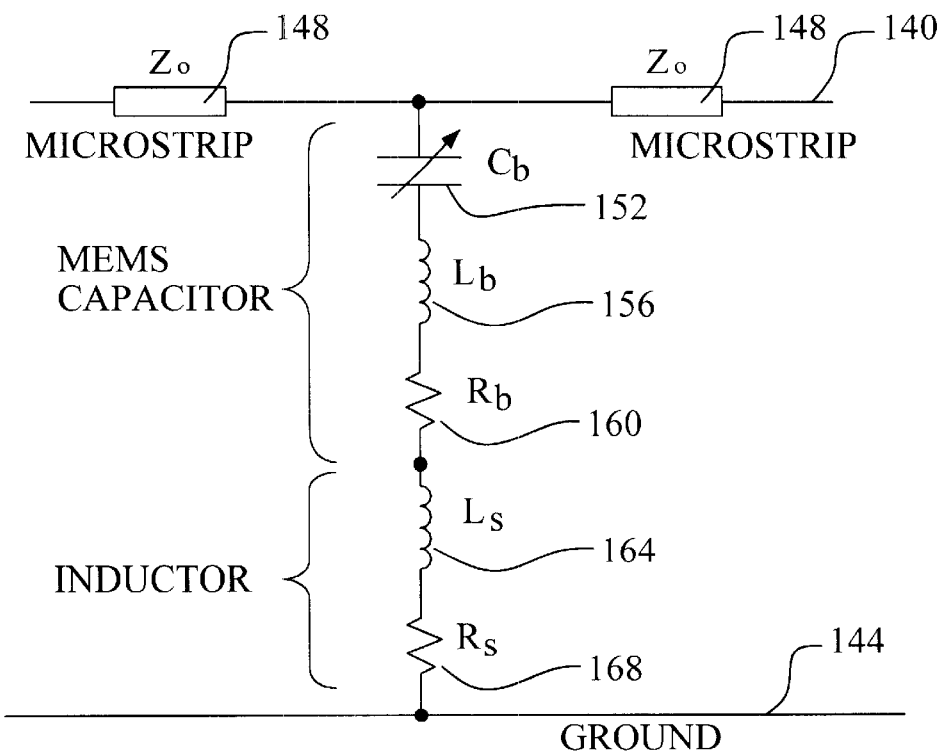
FIG. 7 illustrates schematically the equivalent circuit model of LCR-RF device of the present invention applied in a shunt configuration.

Referring now to FIG. 7, an equivalent circuit model of the LCR-RF switch of the present invention configured as a shunt circuit is illustrated. The microstrip is modeled as two lumped impedance elements $Z_0$ 148. The MEMS capacitor is modeled as a variable capacitor $C_b$ 152 in series with a bridge inductor $L_b$ 156 and a bridge resistance $R_b$ 160. The spiral inductor is modeled as an inductor $L_s$ 164 and an inductor resistance $R_s$ 168. The first end of the spiral inductor is tied to the MEMS capacitor bridge post, and the second end of the spiral inductor is tied to ground 144.

The novel features of the present invention LCR-RF switch are demonstrated by the model. First, the NEMS capacitor achieves a higher DOWN state capacitance $C_b$ 152 due to the up electrode. Second the spiral inductor adds a much larger inductor $L_s$ 164 to the shunting path. Therefore, the resonant frequency of the LCR-RF switch can be reduced to below the 5 GHz. range. This makes the LCR-RF switch extremely useful for communications applications. Further, the inductor $L_s$ 164 can be carefully designed to a specific size and tightly controlled in the fabrication process. Therefore, the optimum resonant frequency can be targeted precisely. The preferred resonant frequency in DOWN state of between about 1 GHz. and 100 GHZ.

Figure 8:
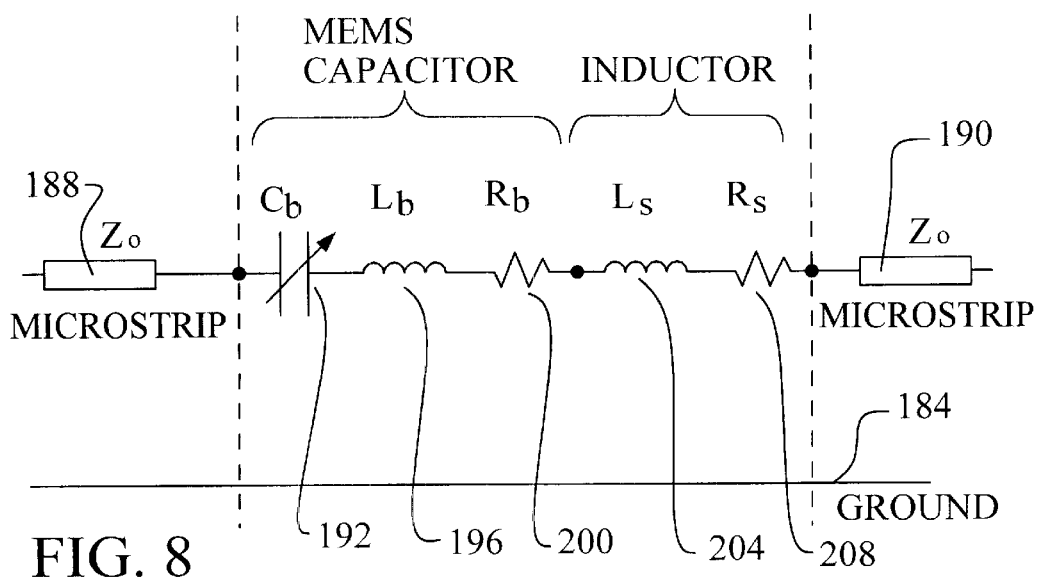
FIG. 8 illustrates schematically the equivalent circuit model of LCR-RF device of the present invention applied in a series configuration.

Referring now to FIG. 8, an equivalent circuit model of the LCR-RF switch of the present invention configured as a series circuit is illustrated. In this case, only a first segment of the microstrip line is tied the MEMS capacitor. A second microstrip line 190 is tied to the output of the spiral inductor. The microstrips are modeled as two lumped impedance elements $Z_0$ 188 and 190. The MEMS capacitor is modeled as a variable capacitor $C_b$ 192 in series with a bridge inductor $L_b$ 196 and a bridge resistance $R_b$ 200. The spiral inductor is modeled as an inductor $L_s$ 204 and an inductor resistance $R_s$ 208. The first end of the spiral inductor is again tied to the MEMS capacitor bridge post. However, the second end of the spiral inductor is tied to the second segment of microstrip 190.

In the series configuration, the LCR-RF switch permits the signal to pass from the first segment 188 to the second segment 190 only when the MEMS capacitor is in the DOWN state. In the UP state, the small capacitive coupling of the MEMS capacitor does not permit the signal to flow.

Figure 9:
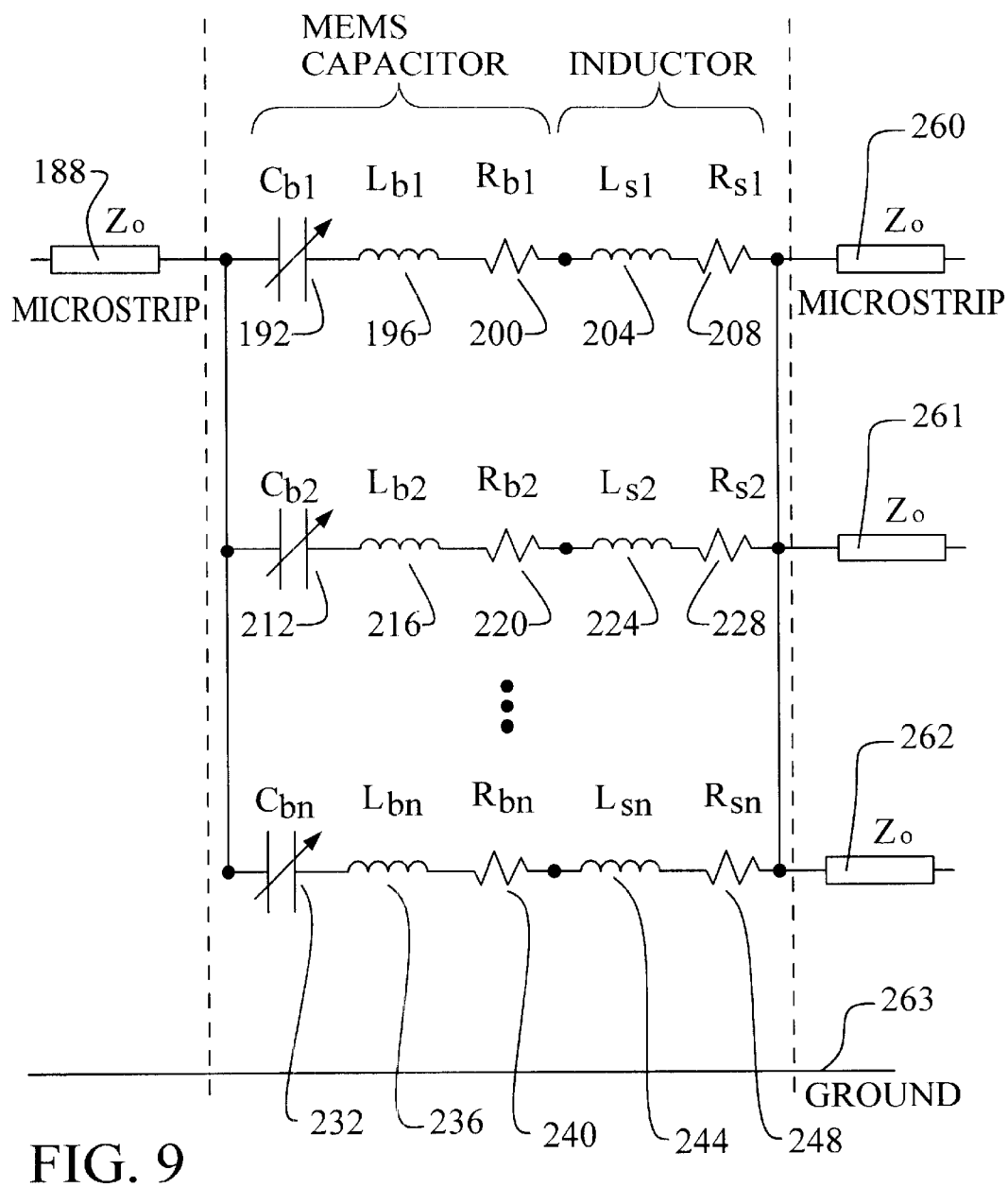
FIG. 9 illustrates schematically the equivalent circuit model of a plurality of LCR-RF devices of the present invention applied in a multiple channel, series configuration.

Referring now to FIG. 9, an equivalent circuit model of a plurality of LCR-RF switches of the present invention configured in a multiple channel, series circuit is illustrated. A separate LCR-RF switch is used for each channel of a selector circuit of size "n." The input segment of the microstrip line 188 is tied all of the MEMS capacitors. The output microstrip lines 260, 261, 262, and 263 are tied to the outputs of separate spiral inductors. The microstrips are modeled as lumped impedance elements $Z_0$ 188, 260, 261, 262, and 263. The first channel MEMS g capacitor is modeled as a variable capacitor $C_{b1}$ 192 in series with a bridge inductor $L_{b1}$ 196 and a bridge resistance $R_{b1}$ 200. The first channel spiral inductor is modeled as an inductor $L_{s1}$ 204 and an inductor resistance $R_{s1}$ 208. The second channel MEMS capacitor is modeled as a variable capacitor $C_{b2}$ 212 in series with a bridge inductor $L_{b2}$ 216 and a bridge resistance $R_{b2}$ 220. The second channel spiral inductor is modeled as an inductor $L_{s2}$ 224 and an inductor resistance $R_{s2}$ 228. The "nth" channel MEMS capacitor is modeled as a variable capacitor $C_{bn}$ 232 in series with a bridge inductor $L_{bn}$ 236 and a bridge resistance $R_{bn}$ 240. The "nth" channel spiral inductor is modeled as an inductor $L_{sn}$ 244 and an inductor resistance $R_{sn}$ 248.

In the multiple channel, series configuration, the LCR-RF switches permit the input signal to pass through to any output segment when the MEMS capacitor for that channel is in the DOWN state. In the UP state, the small capacitive coupling of the MEMS capacitors do not permit the signal to flow to that channel.

Figure 10:
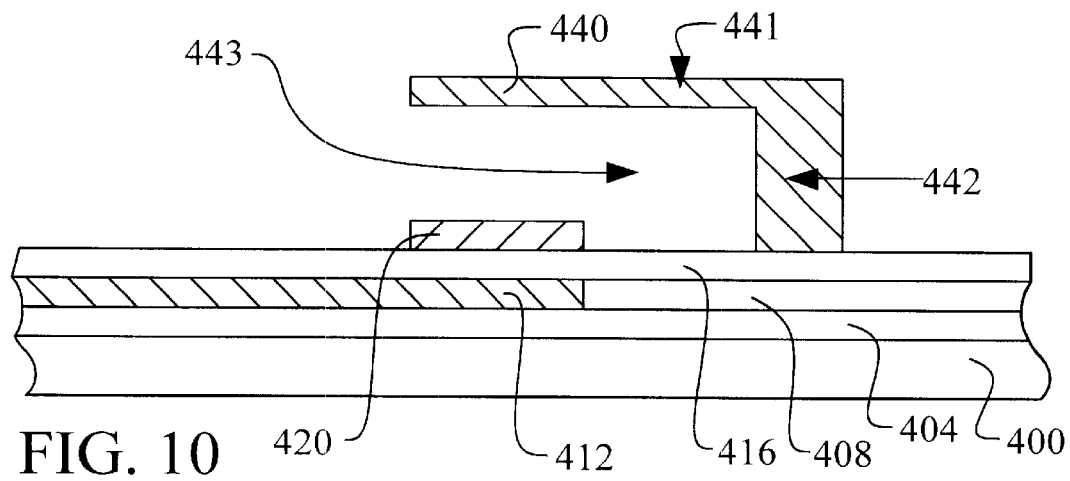
FIGS. 10 and 11 illustrates a second preferred embodiment of the LCR-RF switch of the present invention wherein a single bridge post is used.

Referring now to FIG. 10, a second preferred embodiment of the present invention is illustrated. In this embodiment, the membrane 441 is supported upon a single bridge post 442. Once again, the device is fabricated overlying a substrate 400. A first dielectric layer 404, preferably comprising silicon nitride, overlies the substrate 400. A down electrode 412 overlies the first dielectric layer 404. The down electrode 412 preferably comprises a metal layer. The down electrode 412 may additionally comprise a microstrip line useful for carrying a microwave signal. An interlevel dielectric layer 408 overlies the first dielectric layer 404. The interlevel dielectric layer 408 facilitates the formation of the down electrode 412 using a damascene process. A second dielectric layer 416 overlies the down electrode 412. The second dielectric layer 416 preferably comprises silicon nitride. An important feature is the up electrode 420. The up electrode 420 overlies the down electrode 412 with the second dielectric layer 416 therebetween.

Another important feature of this embodiment is the bridge structure 440. In the bridge structure 441 of the present invention, a single metal layer 440 forms the single bridge post 442 and the membrane 441. The novel bridge structure 440 may be formed using a dual damascene process as will be described in the method of fabrication. In addition, the thin membrane 441 has a preferred thickness of between about 5,000 Angstroms and 25,000 Angstroms.

The theory of operation of the single post device is the same as for the two post device of FIGS. 5 and 6. If the voltage potential between the down electrode 412 and the membrane 441 is less than the minimum activation voltage, then the MEMS capacitor device is in the UP state. In the UP state, the capacitive coupling between the membrane 441 and the down electrode 412 is at a minimum due to the large air gap 443 between the membrane 441 and the up electrode 420. At microwave frequencies, the small capacitance between the bridge structure 440 and the down electrode 412 forms a large impedance value. Therefore, very little of microwave energy is transferred into the bridge structure 440 from the down electrode 412. A large DC bias voltage between the down electrode 412 and the membrane 441 will cause the membrane 441 to flex toward the down electrode 412 due to electrostatic force. The membrane 441 will contact the up electrode 420 at full flexure. The up electrode 420 provides a large top plate for the membrane-to-down electrode capacitor to thereby increase the DOWN state capacitance.

Figure 11:
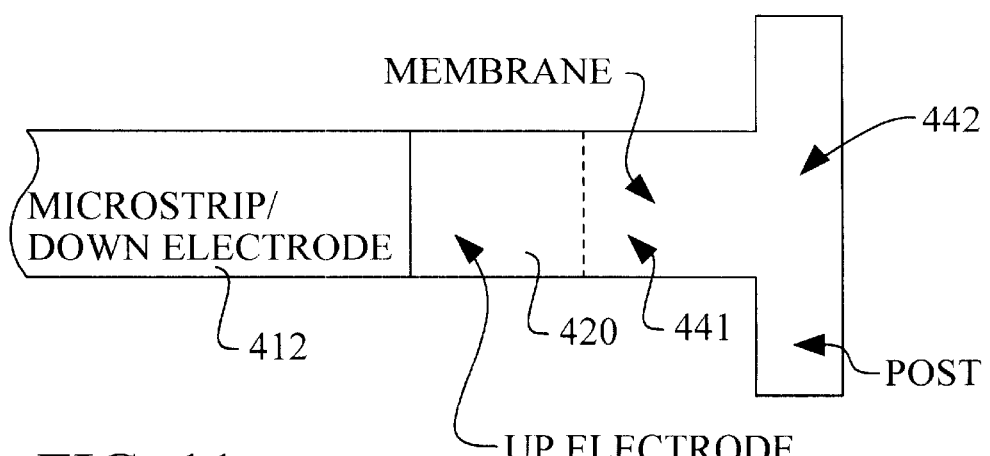

Referring now to FIG. 11, the top view of the second preferred embodiment MEMS capacitor of the LCR-RF switch is shown. The membrane 441 is supported by the post 442 such that the membrane is suspended over the up electrode 420. The down electrode 412 and microstrip are combined.

Referring now to FIGS. 12 through 21c, the preferred method of fabricating the LCR-RF switch of the present invention is illustrated. More particularly, a method to form the MEMS capacitor of the LCR-RF switch is described. The spiral inductor may be fabricated using any patterned metal layer technique, including those illustrated in this embodiment. A dual damascene method for forming the bridge structure, comprising posts and a membrane, is achieved. The damascene process is also applied to the formation of the down electrode and up electrode. However, this is not a crucial aspect of the fabrication method.

Figure 12:
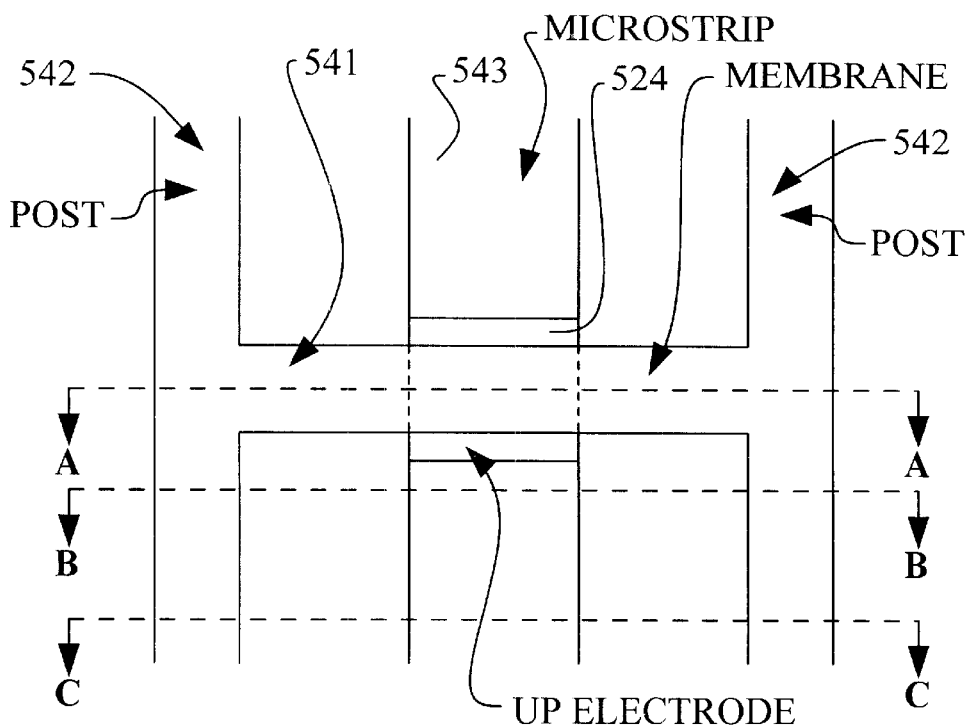
FIG. 12 illustrates a top view of the MEMS capacitor of the LCR-RF switch of the present invention wherein alternative cross sections are labeled.
Figure 16A:
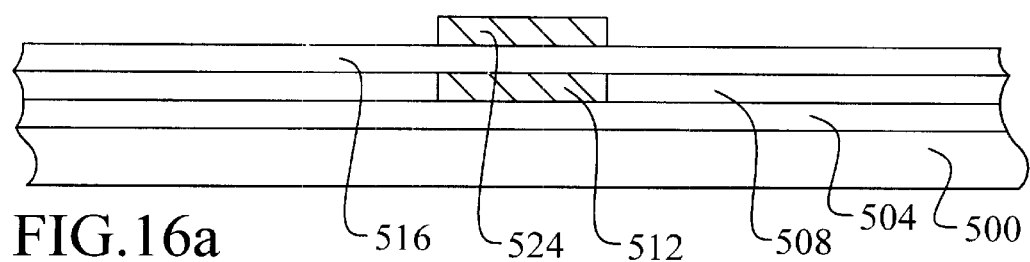

Referring particularly to FIG. 12, a top view of the MEMS capacitor of the LCR-RF switch of the present invention is illustrated. The bridge structure comprises two posts 542 supporting a membrane 541. The membrane 541 is suspended over the up electrode 524. The down electrode, not shown, underlies the up electrode 524 with a dielectric layer therebetween. A metal microstrip line 543 connects to the down electrode. In FIG. 12, three alternative cross sections are labeled as A—A, B—B, and C—C. In the figures that follow, those figures that bear the suffix "a," such as FIG. 16a, show cross section A—A, those bearing "b" show cross section B—B, and those bearing "c" show cross section C—C.

Figure 13:
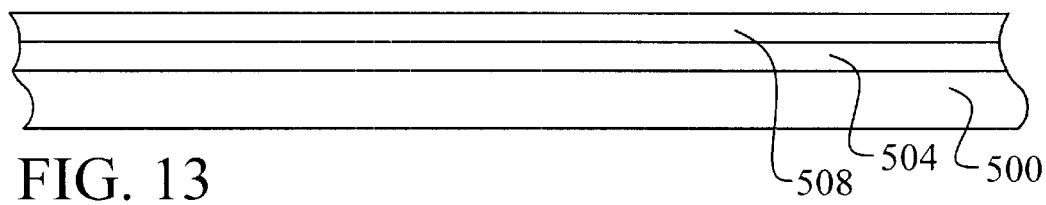
FIG. 13 illustrates a general cross sectional representation of the MEMS capacitor at the first stage of the preferred embodiment of the method of fabrication of the present invention.

Referring particularly to FIG. 13, a general cross-section is illustrated. A substrate 500 is provided. Preferably, the substrate 500 comprises a semiconductor material, such as monocrystalline silicon. This substrate is preferably covered with a thick dielectric material and, more preferably, with a silicon dioxide or low-k material. The fabrication method is intended to facilitate integration of the LCR-RF switch onto a ultra-large scale integration (ULSI) circuit. For simplicity, substrate 500 is shown as a single layer. In practice, the substrate 500 may contain a plurality of layers, devices, and connective lines formed prior to the beginning of the fabrication method of the present invention.

A first dielectric layer 504 is deposited overlying the substrate 500. The first dielectric layer 504 is used to separate and electrically isolate the subsequently formed down electrode from the substrate 500. The first dielectric layer 504 preferably comprises silicon nitride. A first interlevel dielectric layer 503 is deposited overlying the first dielectric layer 504. The first interlevel dielectric layer 503 laterally isolates down electrodes. In the preferred embodiment, the first interlevel dielectric layer 503 comprises silicon dioxide.

Figure 14:
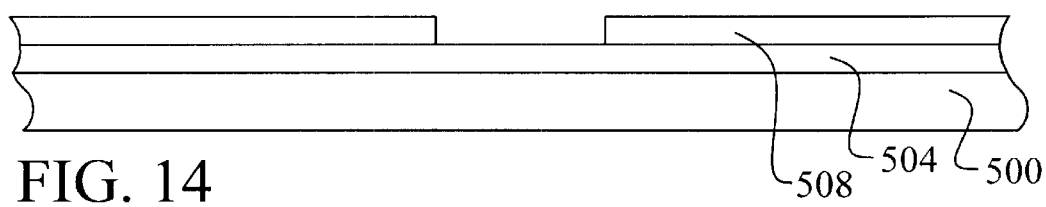
FIGS. 14, 15, 16a, 17, 18a, 19, 20a, and 21a illustrate the A-A cross section of the MEMS device at stages in the preferred method of fabrication of the present invention.

Referring now to FIG. 14, cross section A—A is illustrated for the next step. The first interlevel dielectric layer 508 is patterned to form trenches for the down electrodes. By choosing silicon nitride for the first dielectric layer 504 and silicon dioxide for the first interlevel dielectric layer 508, a selective etching process may be used. The first dielectric layer 508 can act as an etching stop.

Figure 15:
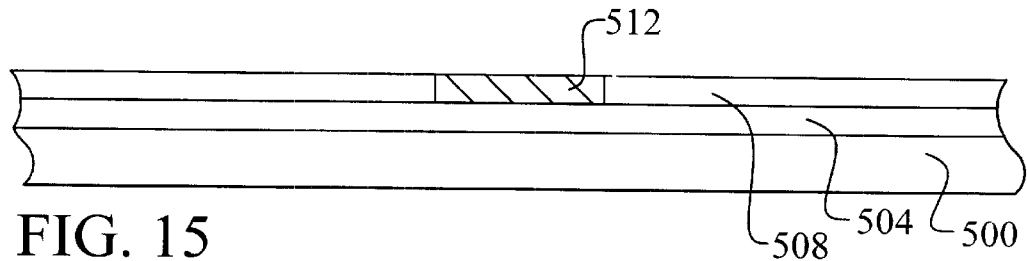

Referring now to FIG. 15, a down electrode metal layer 512 is deposited overlying the first interlevel dielectric layer 508 and filling the trenches. The down electrode metal layer 512 is then polished down to the top surface of the first interlevel dielectric layer 508 to thereby complete the down electrodes 512. The down electrode metal layer 512 preferably comprises copper.

Referring now to FIG. 16a, the up electrode 524 overlies the down electrode 512 with the second dielectric layer 516 therebetween. The second dielectric layer 516 is deposited overlying the first dielectric layer 508 and the down electrode 512. The second dielectric layer 516 preferably comprises silicon nitride. A metal layer 524 is then deposited overlying the second dielectric layer 516. This metal layer 524 is then patterned, or etched, to form the up electrode 524. The up electrode 524 preferably comprises Al, Ta, Ti, or W.

Figure 16B:
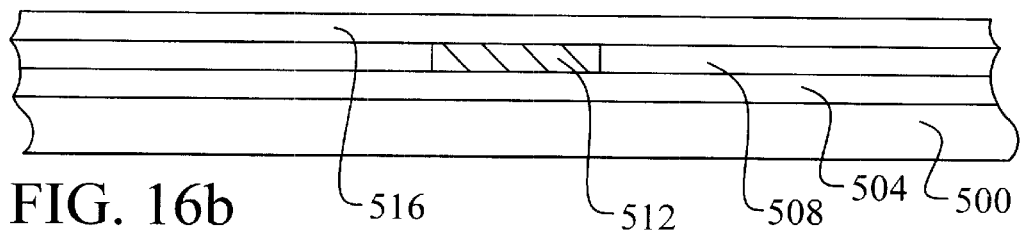
FIGS. 16b, 18b, 20b, and 21b illustrate the B-B cross section of the MEMS device at stages in the preferred method of fabrication of the present invention.

Referring now to FIG. 16b, the B—B cross section is illustrated. Note that the down electrode 512 is present but the up electrode 524 is not present.

Figure 16C:
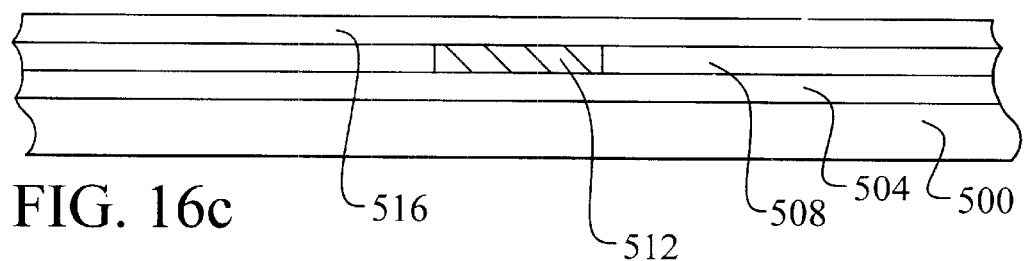
FIGS. 16c, 18c, 20c, and 21c illustrate the C-C cross section of the MEMS device at stages in the preferred method of fabrication of the present invention.

Referring now to FIG. 16c, the C—C cross section is illustrated. Note that the down electrode 512 is present but the up electrode 524 is not present.

Figure 17:
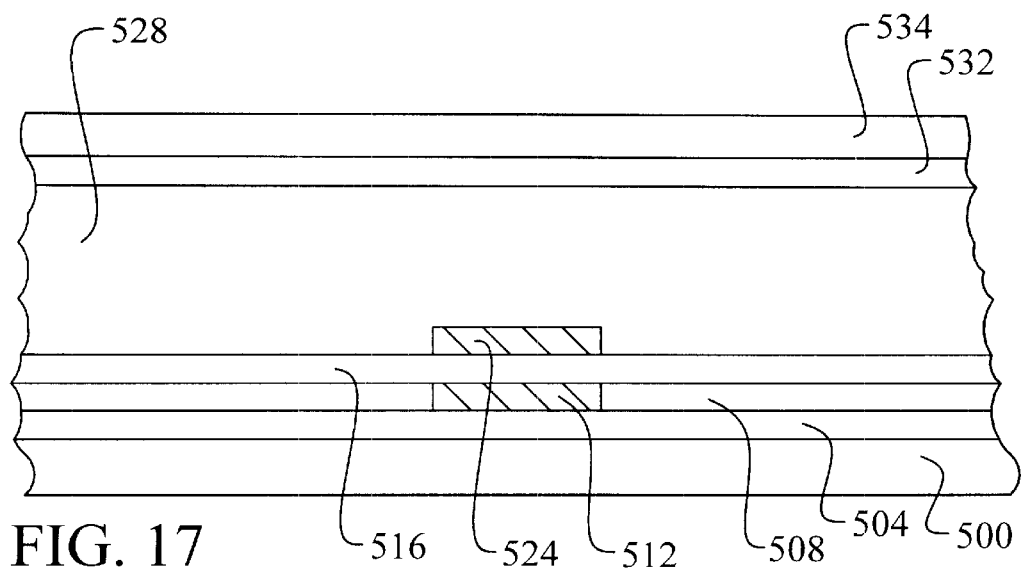

Referring now to FIG. 17, important features of the present invention are illustrated. As a first important feature, a first silicon dioxide layer 528 is deposited overlying the up electrode 524 and the second dielectric layer 516. The first silicon dioxide layer 528 establishes the height of the air space between the subsequently formed membrane and the up electrode 524. The first silicon dioxide layer 528 is preferably deposited by chemical vapor deposition (CVD) to a thickness of between about 5,000 Angstroms and 45,000 Angstroms. The use of a removable first silicon dioxide layer 528 is advantageous because it can be deposited to a very controlled thickness across the wafer and results in uniform die yield.

As a second important feature, a silicon nitride layer 532 is deposited overlying the first silicon dioxide layer 528. The silicon nitride layer 532 will provide a stop layer for etching the subsequently deposited second silicon dioxide layer 534. The silicon nitride layer 532 is preferably deposited by a CVD process to a thickness of between about 300 Angstroms and 2,000 Angstroms.

As a third important feature, a second silicon dioxide layer 534 is deposited overlying the silicon nitride layer 532. The second silicon dioxide layer 534 will establish the thickness of the subsequently formed membrane. The second silicon dioxide layer 534 is preferably deposited by a CVD process to a thickness of between about 5,000 Angstroms and 45,000 Angstroms.

Figure 18A:
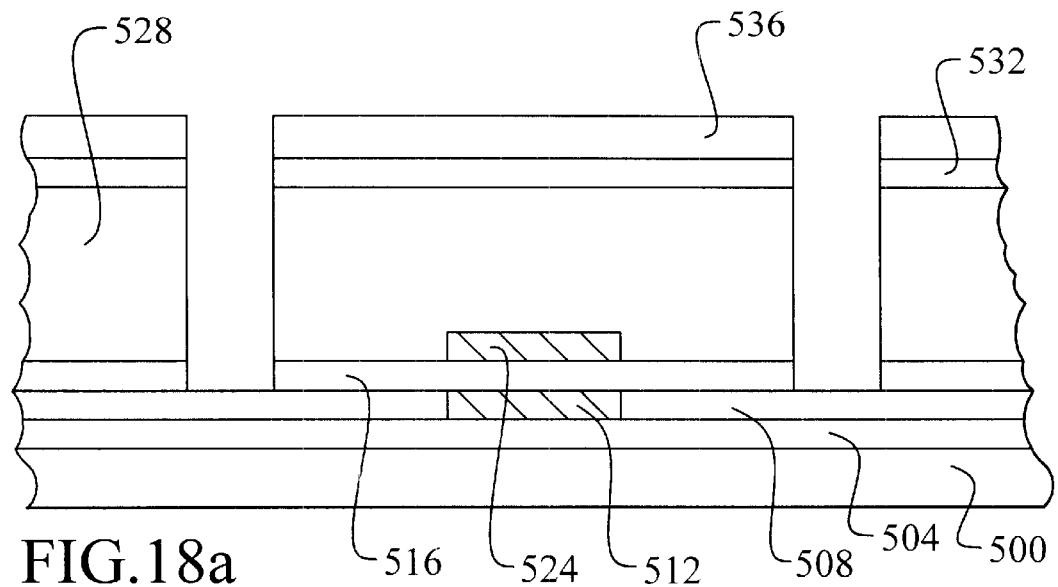

Referring now to FIG. 18a, an important feature of the present invention is illustrated. The second silicon dioxide layer 534, the silicon nitride layer 532, the first silicon dioxide layer 528, and the second dielectric layer 516 are patterned to form deep trenches for the planned bridge posts. A photolithography and etch sequence may be used to pattern the trenches. For example, a photoresist layer, not shown, is deposited overlying the second silicon dioxide layer 534 and then exposed to actinic light through a mask. The photoresist layer is then developed to remove a part of the photoresist layer. A dry etch may then be performed to remove the second silicon dioxide layer 534, the silicon nitride layer 532, the first silicon dioxide layer 528, and the second dielectric layer where exposed by the photoresist. The remaining photoresist is then stripped away. Note that the silicon nitride layer 532 and the second dielectric layer 516 may act etching stops for the second silicon dioxide layer 534 and the first silicon dioxide layer 528, respectively. Finally, it is important to note that these deep trenches may also comprise trenches for planned microstrip lines or spiral inductor lines.

Figure 18B:
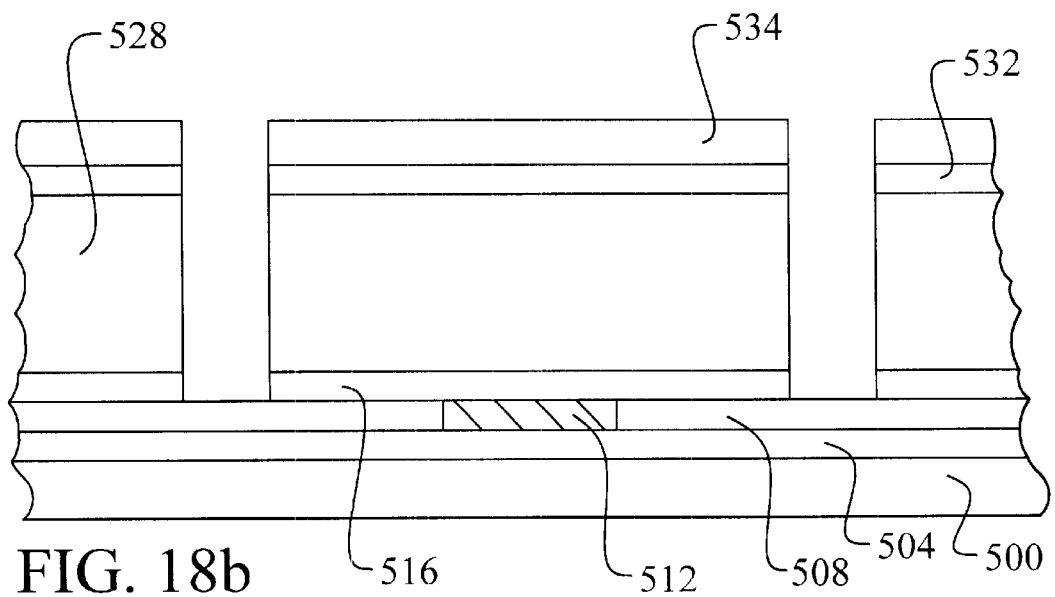

Referring now to FIG. 18b, the B—B cross section is illustrated for this stage. Note that the bridge post trenches are present.

Figure 18C:
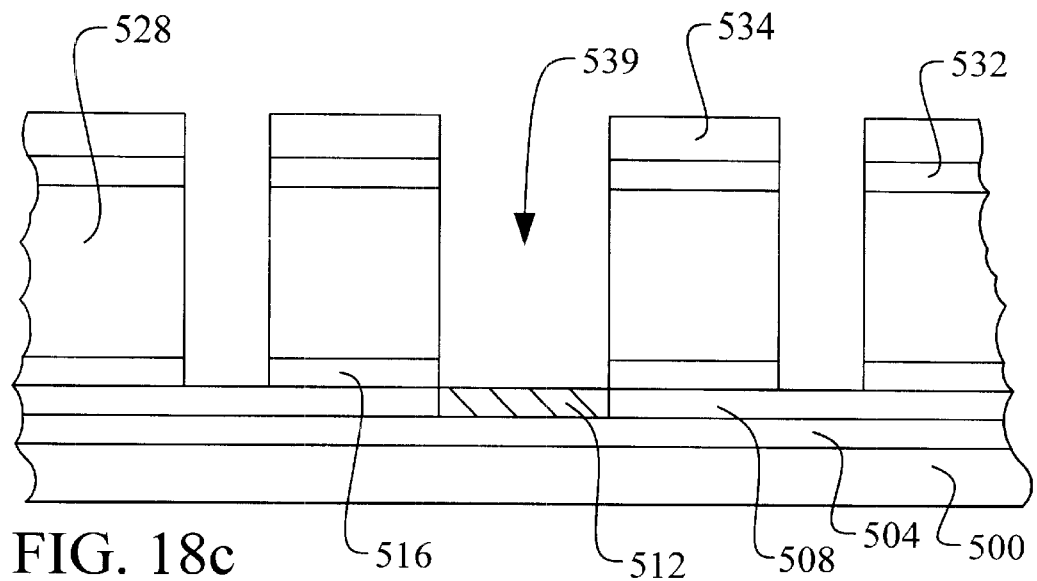
Figure 19:
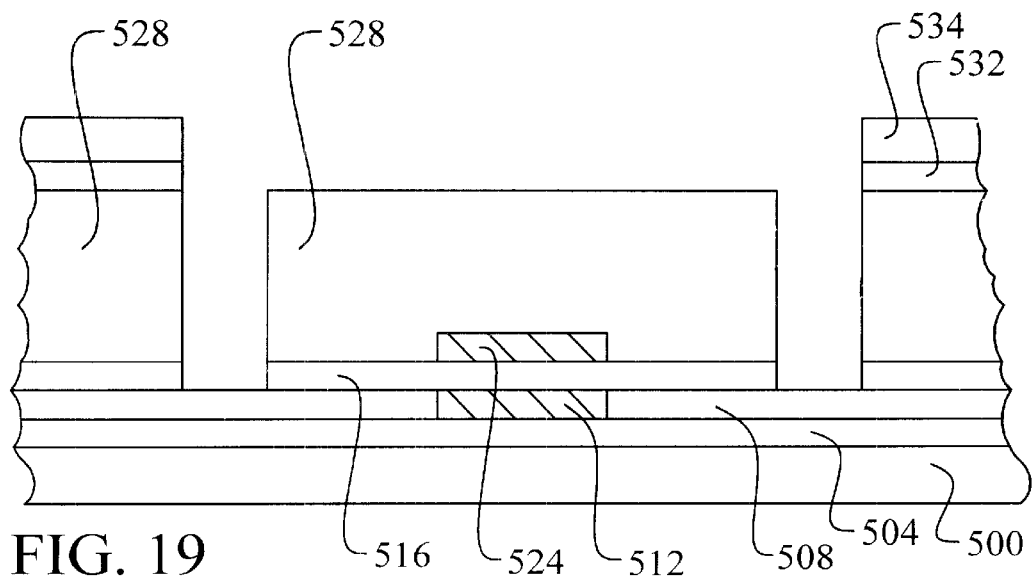

Referring now to FIG. 18c, the C—C cross section is illustrated for this stage. Note first that the bridge post trenches are also present. In addition, note that a trench 539 for a planned microstrip has been etched during the bridge post patterning step. This trench 539 will effectively extend the microstrip layer 512.

Referring now to FIG. 19a, an important feature of the present invention is illustrated. The second silicon dioxide layer 534 and the silicon nitride layer 532 are patterned to form shallow trenches for the planned membrane. The silicon nitride layer 532 may be used as an etching stop for the dry etching of the second silicon dioxide layer 534. The first silicon dioxide layer 528 may be used as an etching stop for the dry etching of the silicon nitride layer 532. Note that the second silicon dioxide layer 534 and the silicon nitride layer 532 are only etched where the membrane is planned. In this way, both the membrane and the bridge posts may be formed by a damascene technique.

Figure 20A:
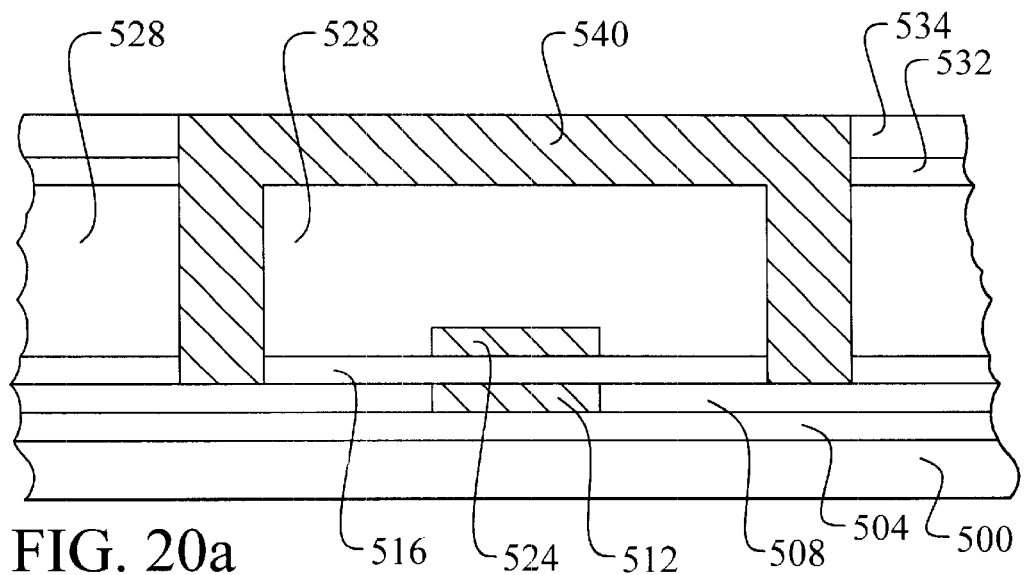

Referring now to FIG. 20a an important feature of the present invention is illustrated. A metal layer 540 is deposited overlying the second silicon dioxide layer 534, the silicon nitride layer 532, and the first silicon dioxide layer 528, and filling the trenches. The metal layer 540 fills both the shallow membrane trenches and the deep bridge post trenches. Further, if microstrip trenches or if spiral inductor trenches are present, these trenches are filled as well. The metal layer 540 may comprise, for example, copper or copper alloy.

The metal layer 540 is then polished down to the top surface of the second silicon dioxide layer 534 to form the membrane and the bridge posts from a common metal layer 540. Preferably, a chemical mechanical polish is used for the polishing down process. The method is dual damascene since a single metal deposition fills both types of trenches. Further, this process can be integrated with up metal processing for an ULSI device. This polishing down step also completes any microstrip lines or spiral inductors in the process.

Figure 20B:
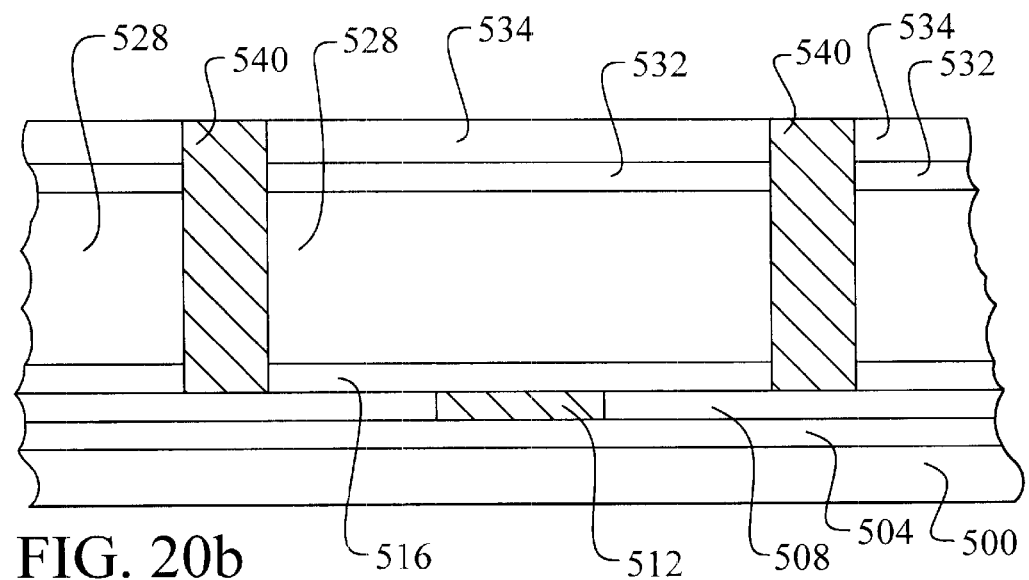

Referring now to FIG. 20b, the B—B cross section for this stage is shown. The bridge posts 540 are completed. Because the second silicon dioxide layer 534 and the silicon nitride layer 532 were not etched in this area, no membrane is formed.

Figure 20C:
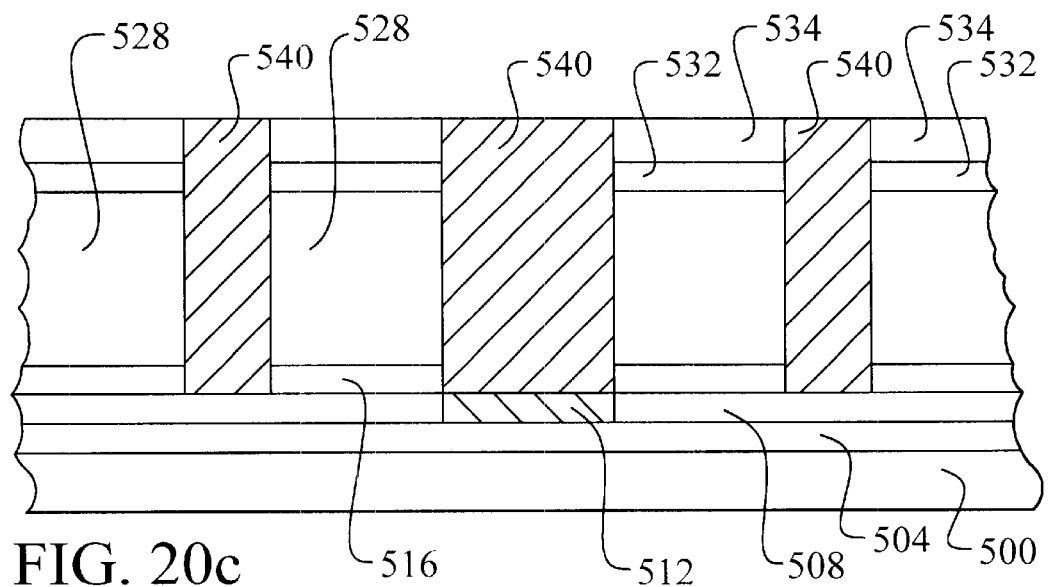

Referring now to FIG. 20c, the C—C cross section for this stage is shown. The bridge posts 540 and the microstrip line 540 are formed by the metal deposition and polish down. No membrane is formed because the second silicon dioxide layer 534 and the silicon nitride layer were not patterned in this area.

Figure 21A:
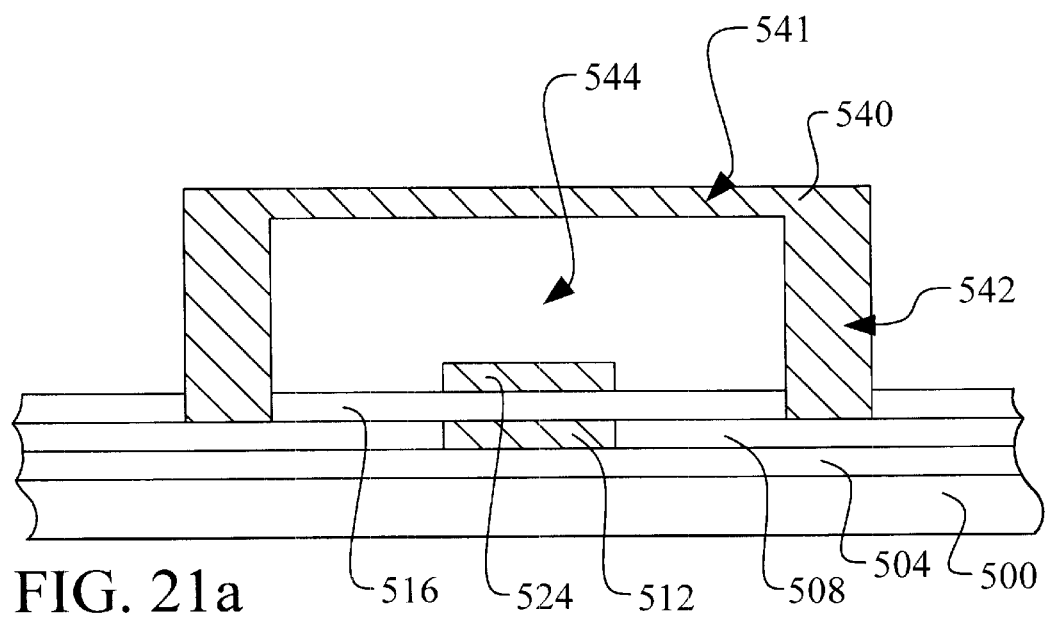

Referring now to FIG. 21a, another important feature of the present invention is illustrated. The second silicon dioxide layer 534, the silicon nitride layer 532 and the first silicon dioxide layer 528 are etched away to complete the MEMS capacitor device. This forms a void underlying the membrane 541 and adjacent to the bridge posts 542. The membrane 541 is freed to flex under electrostatic force. Further, the up electrode 524 is exposed so that the membrane 541 and the up electrode 524 may contact at full flexure. The second silicon dioxide layer 534, the silicon nitride layer 532 and the first silicon dioxide layer 528 may be removed by a dry etching process that is isotropic, or non-directional, in character.

Figure 21B:
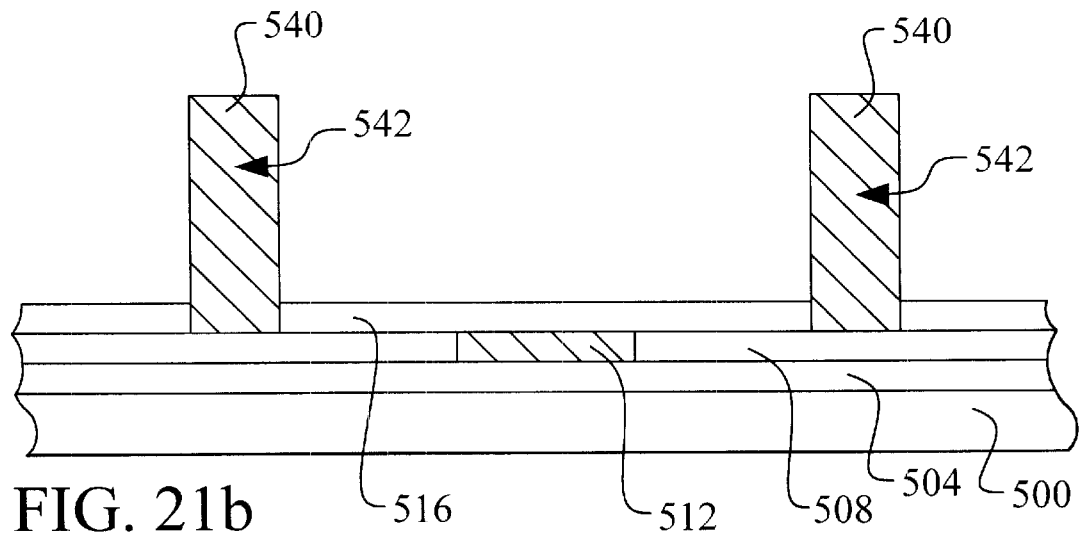

Referring now to FIG. 21b, the B—B cross section is illustrated. The removal of the second silicon dioxide layer 534, the silicon nitride layer 532 and the first silicon dioxide layer 528 leaves the free standing bridge posts 542.

Figure 21C:
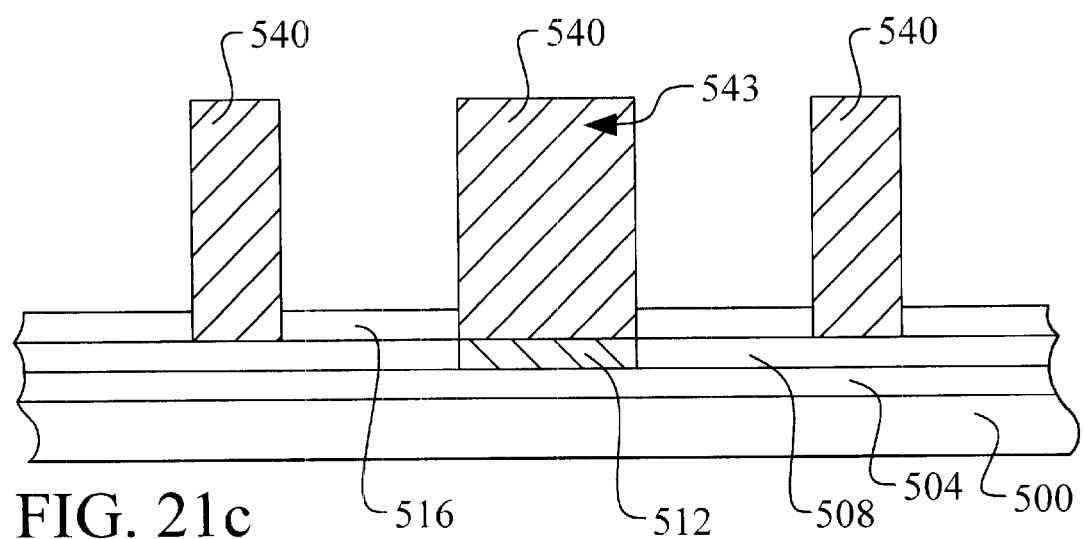

Referring to FIG. 21c, the C—C cross section is illustrated. The removal of the second silicon dioxide layer 534, the silicon nitride layer 532 and the first silicon dioxide layer 542 leaves the bridge posts 542 and the microstrip 543.

The advantages of the present invention may now be summarized. First, a novel LCR-RF device is achieved. This device combines a MEMS capacitor with a spiral inductor to create a microwave switch with a precise resonant frequency. Second, the LCR-RF switch can be designed for operation in the regime between about 1 GHz and 5 GHz where a larger capacitance and inductance is needed. Third, the LCR-RF switch can be constructed using a single post or a double post bridge structure. Fourth, the LCR-RF device can be configured for shunting or for series operation. Fifth, a plurality of LCR-RF devices can be combined to form a multiple channel, series circuit. Sixth, a method for fabricating the LCR-RF switch is described. The method is compatible with dual damascene upper metal processing and ULSI processing. The dual damascene process for forming the bridge posts and membrane of the MEMS capacitor produces devices with better yield and uniformity than the prior art.

As shown in the preferred embodiments, the present invention provides a very manufacturable LCR-RF device and a method of fabrication in the manufacture of an integrated circuit device.

While the invention has been particularly shown and described with reference to the preferred embodiments thereof, it will be understood by those skilled in the art that various changes in form and details may be made without departing from the spirit and scope of the invention.

What is claimed is:

1. A inductor-capacitor resonance RE switching device comprising:
  a microelectronic mechanical switch comprising:
    a first dielectric layer overlying substrate;
    a down electrode overlying said first dielectric layer;
    a second dielectric layer overlying said down electrode;
    a bridge post overlying said first dielectric layer but not overlying said down electrode; and
    a membrane suspended over said down electrode wherein one end of said membrane is fixed to the top of said bridge post, wherein an electrostatic potential between said membrane and said down electrode will cause said membrane to flex down toward said down electrode, and wherein said flexing of said membrane will cause the capacitance of said switching device to vary; and a spiral inductor comprising a metal line configured in a spiraling pattern with a first end connected to said bridge post and a second end forming an output node.

2. The device according to claim 1 further comprising:
an input signal line connected to said down electrode; and
a ground reference connected to said output node to thereby form a shunt configuration.

3. The device according to claim 1 further comprising:
an input signal line connected to said down electrode; and
an output signal line connected to said output node to thereby form a series configuration.

4. The device according to claim 1 further comprising an up electrode wherein said up electrode overlies said down electrode with said second dielectric layer therebetween and wherein said flexing downward causes said membrane to contact said up electrode.

5. The device according to claim 1 wherein said membrane and said bridge post comprise metal.

6. The device according to claim 1 wherein said membrane has a thickness of between about 5,000 Angstroms and 25,000 Angstroms.

7. The device according to claim 1 wherein said membrane and said bridge post are formed by a dual damascene process.

8. The device according to claim 1 further comprising a second bridge post wherein said second bridge post is opposite said bridge post and wherein a second end of said membrane is fixed to the top of said second bridge post such that the combination of said bridge post, said second bridge post, and said membrane forms a bridge profile.

9. The device according to claim 1 wherein said capacitance is between about 10 pF and 30 pF when said microelectronic mechanical switch is in a Down state.

10. The device according to claim 1 wherein said spiral inductor value is between about 1 nH and 30 nH.

11. The device according to claim 1 wherein said capacitance and said spiral inductor create a resonant frequency of between about 1 GHz and 100 GHz when said microelectronic mechanical switch is in a Down state.

12. A inductor-capacitor resonance RF switching device comprising:
a microelectronic mechanical switch comprising:
a first dielectric layer overlying a substrate;
a down electrode overlying said first dielectric layer;
a second dielectric layer overlying said down electrode;
an up electrode overlying said down electrode with said second dielectric layer therebetween;
a bridge post overlying said first dielectric layer but not overlying said down electrode and said up electrode; and
a membrane suspended over said up electrode wherein one end of said membrane is fixed to top of said bridge post, wherein an electrostatic potential between said membrane and said down electrode will cause said membrane to flex down toward said down electrode, wherein said flexing downward causes said membrane to contact said up electrode, and wherein said flexing of said membrane will cause the capacitance of said inductor-capacitor resonance RF switching device to vary; and
a spiral inductor comprising a metal line configured in a spiraling pattern with a first end connected to said bridge post and a second end forming an output node.

13. The device according to claim 12 further comprising:
an input signal line connected to said down electrode; and
a ground reference connected to said output node to thereby form a shunt configuration.

14. The device according to claim 12 further comprising:
an input signal line connected to said down electrode; and
an output signal line connected to said output node to thereby form a series configuration.

15. The device according to claim 12 wherein said membrane and said bridge post comprise metal.

16. The device according to claim 12 wherein said membrane has a thickness of between about 5,000 Angstroms and 25,000 Angstroms.

17. The device according to claim 12 wherein said membrane and said bridge post are formed by a dual damascene process.

18. The device according to claim 12 further comprising a second bridge post wherein said second bridge post is opposite said bridge post and wherein a second end of said membrane is fixed to the top of said second bridge post such that the combination of said bridge post, said second bridge post, and said membrane forms a bridge profile.

19. The device according to claim 12 wherein said capacitance is between about 10 pF and 30 pF when said microelectronic mechanical switch is in a Down state.

20. The device according to claim 12 wherein said spiral inductor value is between about 1 nH and 30 nH.

21. The device according to claim 12 wherein said capacitance and said spiral inductor create a resonant frequency of between about 1 GHz and 100 GHz when said microelectric mechanical switch is in a Down state.

22. A multiple channel, series-configured, switching circuit comprising a plurality of MEMS capacitor and spiral inductor pairs, wherein in each said pair, a first end of each said spiral inductor is connected to a bridge post of each said MEMS capacitor, wherein down electrodes of all said MEMS capacitors are connected to a single input signal, wherein a second end of each said spiral inductor forms a plurality of output signals, and wherein activation of any said MEMS capacitor in any said pair causes said input signal to flow to an output signal for said pair.

23. The circuit according to claim 22 wherein each said MEMS capacitor has an up electrode.

24. A method to form a microelectronic mechanical switch device in the manufacture of an integrated circuit device comprising:
providing a down electrode overlying a substrate with a first dielectric layer therebetween;
providing a second dielectric layer overlying said down electrode layer;
forming an up electrode overlying said second dielectric layer;
depositing a first silicon dioxide layer overlying said up electrode and said second dielectric layer;
depositing a silicon nitride layer overlying said first silicon oxide layer;
depositing a second silicon dioxide layer overlying said silicon nitride layer;
patterning said first silicon dioxide layer, said silicon nitride layer, said first silicon dioxide layer, and said second dielectric layer to form deep trenches for planned bridge posts;
patterning said second silicon dioxide layer and said silicon nitride layer to form shallow trenches for planned membrane wherein said second silicon dioxide layer and said silicon nitride layer are etched through to said first silicon dioxide layer and wherein said shallow trenches connect to said deep trenches;

depositing a metal layer overlying said second silicon dioxide layer, said silicon nitride layer, said first silicon dioxide layer, and said second dielectric layer to fill said deep trenches and said shallow trenches;

polishing down said metal layer to said second silicon dioxide layer to complete said bridge posts and said membrane; and etching away said second silicon dioxide layer, said silicon nitride layer and said first silicon dioxide layer to release said membrane and to complete said microelectronic mechanical switch device in the manufacture of said integrated circuit device.

25. The method according to claim 24 wherein said first silicon dioxide layer is deposited to a thickness of between about 5,000 Angstroms and 45,000 Angstroms.

26. The method according to claim 24 wherein said silicon nitride layer is deposited to a thickness of between about 300 Angstroms and 2,000 Angstroms.

27. The method according to claim 24 wherein said polishing down is by a chemical mechanical polish.

28. The method according to claim 24 wherein said membrane has a thickness of between about 5,000 Angstroms and 25,000 Angstroms.

29. The method according to claim 24 wherein said step of patterning said second silicon dioxide layer, said silicon nitride layer, said first silicon dioxide layer, and said second dielectric layer to form deep trenches for planned bridge posts further comprises forming deep trenches for planned microstrip lines, wherein said step of depositing a metal layer further comprises filling said deep trenches for said planned microstrip lines, and wherein said step of polishing down said metal layer further comprises completing said microstrip lines.

30. The method according to claim 24 wherein said step of patterning said second silicon dioxide layer, said silicon nitride layer, said first silicon dioxide layer, and said second dielectric layer to form deep trenches for planned bridge posts further comprises forming deep trenches for planned spiral inductors, wherein said step of depositing a metal layer further comprises filling said deep trenches for planned spiral inductors, and wherein said step of polishing down said metal layer further comprises completing said spiral inductors.

* * * * *